(12) United States Patent  
Bettacchini

(10) Patent No.: US 7,472,729 B2
(45) Date of Patent: Jan. 6, 2009

(54) GUARD

(75) Inventor: Marcello Bettacchini, Perugia (IT)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/273,127

(22) Filed: Nov. 14, 2005

(65) Prior Publication Data

US 2007/0107804 A1    May 17, 2007

(51) Int. Cl.
*B27G 19/00* (2006.01)
(52) U.S. Cl. .................................. 144/251.1; 144/252.1
(58) Field of Classification Search .............. 144/114.1, 144/117.1, 251.1, 252.1, 251.2, 251.3, 286.5, 144/253.3
See application file for complete search history.

(56) References Cited

U.S. PATENT DOCUMENTS 1,394,499 A * 10/1921 Ingstrum .................. 144/251.3
1,984,224 A * 12/1934 Maxant ....................... 83/333
3,871,260 A * 3/1975 Rees ........................... 83/478
4,401,142 A    8/1983 Linossi

FOREIGN PATENT DOCUMENTS

| DE | 744117 | | 1/1944 |
| DE | 9109322 U | | 9/1991 |
| DE | 10155794 | | 8/2002 |
| EP | 0085636 | * | 8/1983 |
| EP | 1249321 | | 10/2002 |
| EP | 1570964 A2 | | 9/2005 |
| FR | 2645066 | * | 10/1990 |

* cited by examiner

*Primary Examiner*—Shelley Self
(74) *Attorney, Agent, or Firm*—Michael Arenoff; Adan Ayala

(57) ABSTRACT

A planer including a frame, at least one table mounted on or within the frame, a cutting drum rotatably mounted within the frame, and a motor mounted within the frame and capable of rotatingly driving the cutting drum. The planer also includes a rotatable socket, for receiving a cutting tool, connected to the cutting drum so that rotation of the cutting drum results in rotation of the socket and the cutting tool. The planer further includes a cover for covering the cutting tool and the cover is capable of being moved from a first position where the cover covers the cutting tool to a second position where the cover does not cover the cutting tool.

14 Claims, 10 Drawing Sheets

GUARD

FIELD OF THE INVENTION

The present invention relates to a guard for a cutting tool mounted on a planer, a thicknesser or a combination of a planer and thicknesser, for cutting holes in a work piece and in particular, for cutting mortises for a mortise and tenon joints.

BACKGROUND OF THE INVENTION

A typical mortise and tenon joint can be seen in FIG. 1 and is used to secure two workpieces 30, 32 together. A mortise and tenon joint consists of a tongue 34 (the "tenon") formed on one work piece 30 which fits into a corresponding shaped hole 36 (the "mortise") formed in the second work piece 32. Typically the work pieces are timber. The size and shape of the tenon 34 is the same as that of the mortise 36 to provide a secure fit and thus a stable joint between the two work pieces 30, 32.

A sketch of a typical planer and thicknesser is shown in FIG. 2 and comprises a box like frame 4 comprising a horizontal rectangular upper table 14,16 and a base 6 connected to each other along their longer sides by two side walls 8. The horizontal upper table 14, 16 is located directly above the rectangular base 6. A first aperture 12 is formed by one of the shorter ends of the upper table 14, 16, by the base 6 and by one end of each of the two side walls 8. Similarly, a second aperture (not visible) is formed on the opposite side of the rectangular box frame by the other shorter end of the upper table 14, 16, the other end of the base 6, together with the other ends of each of the side walls 8. A passage way 22 connects the two apertures 12 to each other.

The upper table is constructed from two rectangular sections, a front section 14 and a rear section 16. The two sections 14, 16 of the upper table are constructed from single rectangular sheets of metal having smooth top surfaces. The top surface of the front section 14 is parallel to the top surface of the rear section 16. Both the top surfaces are smooth so that a work piece can be slid across their surfaces. The height of the front section 14 can be adjusted relative to the height of the rear section 16. The two sections 14, 16 are separated by a slot 18.

A horizontal lower table 20 is located movably within the passage way 22. The plane of the lower table 20 is parallel to that of the upper table 14, 16. The lower table 20 is constructed as single rectangular sheet of metal having a smooth top surface. The lower table 20 extends through the full length of the passage way 22 from the first aperture 12 to the second aperture. The width of the table 20 is slightly less than that the width of the passage way 22. The table 20 is mounted in such a manner that it can be moved vertically upwards or downwards by a height adjustment mechanism 190, the top surface of the table remaining horizontal at all times during this process.

A cutting drum 24 is rotatably mounted within the frame 4 in such a manner that its axis of rotation is perpendicular to the plane of the side walls 8 and parallel to the planes of the upper 14, 16 and lower 20 tables. The cutting drum 24 can be rotatably driven by an electric motor (not shown) mounted within the base 6.

A part of the periphery of the cutting drum 24 along its length extends through the slot 18 between the front 14 and rear 16 sections of the upper table.

A cutting blade is mounted within each of two grooves 28 of the cutting drum 24 which runs along the length of the cutting drum 24 in well known manner parallel to the axis of rotation. The cutting blades of the cutting drum 24 can be used to cut work pieces in well known manner which are either slid across the upper table 14, 16 in one direction or are slid across the lower table 20 in the other direction.

The cutting drum 24 is located so that, as the cutting drum 24 rotates, the maximum height of the cutting blade mounted within the cutting drum 24 through the slot 18 is the same as that of the height of the rear section 16 of the upper table, the height of the rear section being fixed.

Two drive rollers (not shown) are mounted on either side of the cutting drum 24 inside the frame 4 between the side walls 8 in such a manner that their axes of rotation are parallel to that of the cutting drum 24. The two drive rollers are rotatably driven by the same electric motor which is used to drive cutting drum 24. The function of the two drive rollers is to force any work pieces which are fed through the passageway 22 to slide across the lower table 20 and engage with the cutting blades as they pass below the axis of rotation of rotating cutting drum 24 at its lowest point in well known manner.

A planer and thicknesser can be used in two different modes of operation.

In the first mode of operation, a workpiece is slid across the upper table 14, 16 in order to remove the surface of the work piece which is adjacent to the smooth top surface of the upper table 14, 16. The height of the front section 14 of the upper table determines the amount of material which is to removed from the work piece. The height of the front section 14 is adjusted so that the cutting action of the rotating drum 24 removes the right thickness of material from the lower surface of the work piece. The cutting drum 24 is then rotatingly driven by the electric motor. Whilst the cutting drum 24 is rotating, the work piece is slid across the front section 14 of the upper table until it engages with the cutting blade of the cutting drum 24 as it rotates, which repeatedly passes through the slot 18 between the front 14 and rear 16 sections. It is then slid onto the rear section 16 of the upper table across the rotating cutting drum 24. As the work piece passes over the rotating blades of the cutting drum 24, the cutting blades remove material from the underside of the work piece.

In the second mode of operation, a work piece is slid across the smooth surface of the lower table 20 in order to remove the top surface of the work piece. The height of the lower table 20 within the passageway determines the amount of material which will be removed from the top surface of the work piece as it is passes through the passageway. The height of the lower table 20 is adjusted so that the cutting action of the rotating drum 24 removes the correct thickness of material from the top surface of the work piece. The cutting drum 24 is then rotatingly driven by the electric motor. Whilst the cutting drum 24 is rotating, the work piece is slid across the lower table 20, until the upper surface of the work piece engages with the rotating cutting blades of the cutting drum 24 as the cutting drum rotates. As a work piece passes under the cutting blades, the cutting blades remove material from the topside of the workiece. The two drive rollers, which are also being rotatingly driven by the electric motor force the work piece through the passageway 22.

UK patent application number 0404557.1 provides a description of one design of planer and thicknesser.

Most planer and thicknessers have provision for a cutting tool 40 to be attached to the end of the cutting drum 24. The most common type of cutting tool 40 is one for making mortises 36 for mortise and tenon joints. The cutting tool 40, when mounted on the end of the cutting drum 24, is co-axial with the drum 24 and projects from the side of the cutting drum 24 as shown in FIG. 2. When the cutting drum 24 is rotatingly driven by the motor, the cutting tool 40 also rotates.

Though the cutting tool 40 can be attached and removed as desired, it is preferable to be able to leave the cutting tool 40 attached thus saving the operator time. However, when the cutting drum 24 is rotated for any reason, the cutting tool 40 also rotates. This results in a hazard to the operator when the cutting tool 40 is not intended to be used, for example, when the planer and thicknesser is planing a work piece.

BRIEF SUMMARY OF THE INVENTION

According to a first aspect of the present invention there is provided a planer and/or thicknesser comprising a frame;
at least one table mounted on or within the frame;
a cutting drum rotatably mounted within the frame;
a motor, capable of rotatingly driving the cutting drum mounted within the frame; wherein the cutting drum is arranged to cut a work piece when a work piece is passed over the table when the cutting drum is rotatably driven by the motor,
a rotable socket, for receiving a cutting tool, connected to the cutting drum so that rotation of the cutting drum results in rotation of the socket;
characterised in that there is provided a cover, at least part of which is capable of being moved between a first position where, when a cutting tool is located within the socket, the cutting tool is exposed, and a second position where the cutting tool is surrounded;
wherein there is further provided biasing means which urges the moveable part of the cover to the second position.

According to a second aspect of the present invention there is provided a guard for a planer and/or thicknesser comprising a frame;
at least one table mounted on or within the frame;
a cutting drum rotatably mounted within the frame;
a motor, capable of rotatingly driving the cutting drum, mounted within the frame; wherein the cutting drum is arranged to cut a work piece when a work piece is passed over the table when the cutting drum is rotatably driven by the motor,
a rotable socket, for receiving a cutting tool, connected to the cutting drum so that rotation of the cutting drum results in rotation of the socket;
characterised in that the guard comprises mounting means for attaching to a planer and/or thicknesser and at least two tubular sleeves arranged in a telescopic formation, wherein one sleeve is capable of telescopically sliding into and out of the other sleeve.

BRIEF DESCRIPTION OF THE DRAWINGS

An embodiment of the present invention will now be described with reference to following drawings of which:

Referring to FIGS. 3 and 4, a cutting tool 40 is attached to the end of the cutting drum of a planer and thicknesser. The mechanism by which the cutting tool is attached is well known and as such is not described within this specification. Furthermore, the specific design of cutting tool 40 is well known and likewise is not described in this specification. A guard, generally denoted by reference number 50 is attached to the side wall 8 of the planer and thicknesser and which is capable of surrounding the cutting tool 40.

The guard will now be described in more detail.

DETAILED DESCRIPTION OF THE INVENTION

Figure 6A:
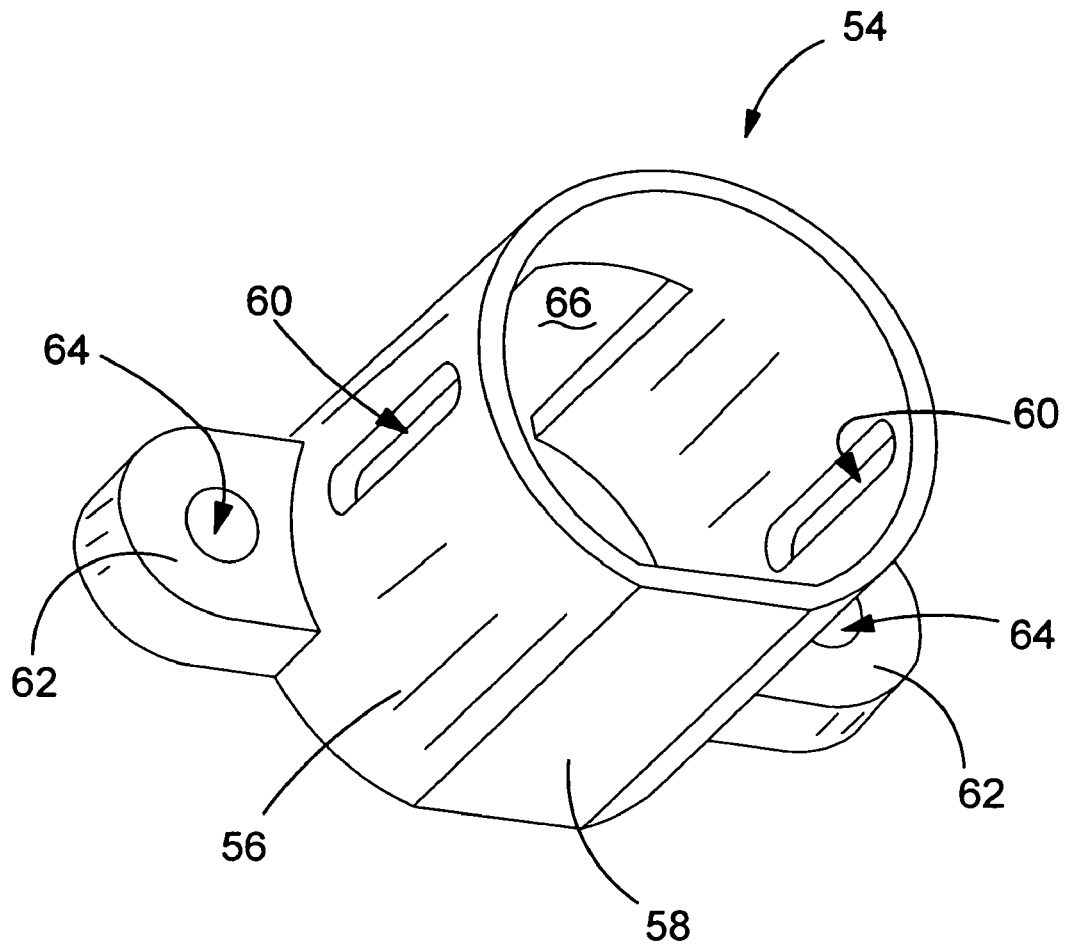
FIGS. 6A and 6B show perspective views of the second outer sleeve when view from its two ends.
Figure 6B:
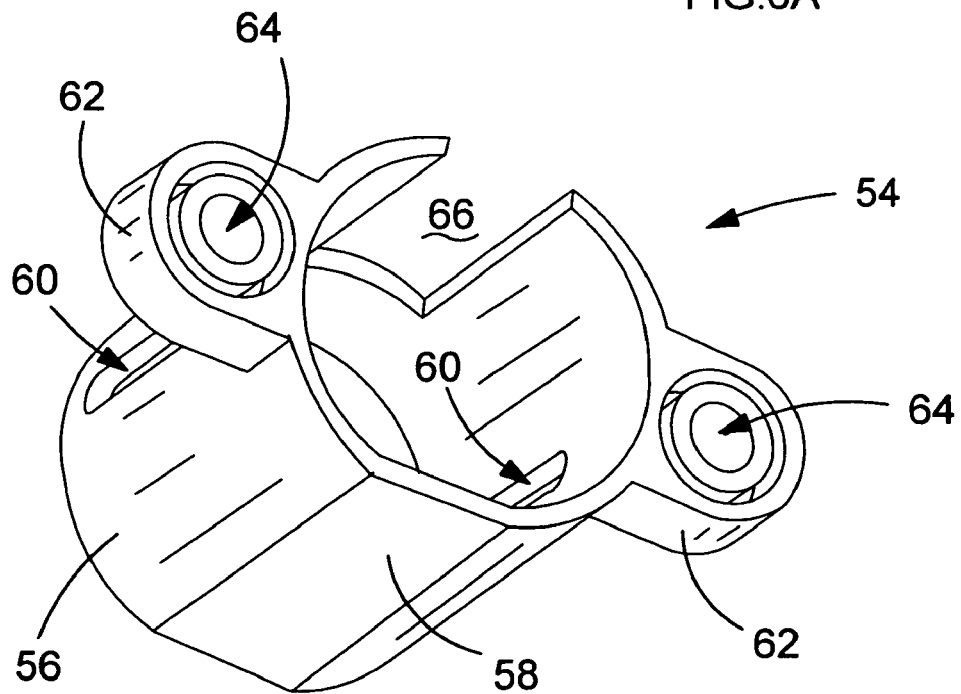
Figure 7A:
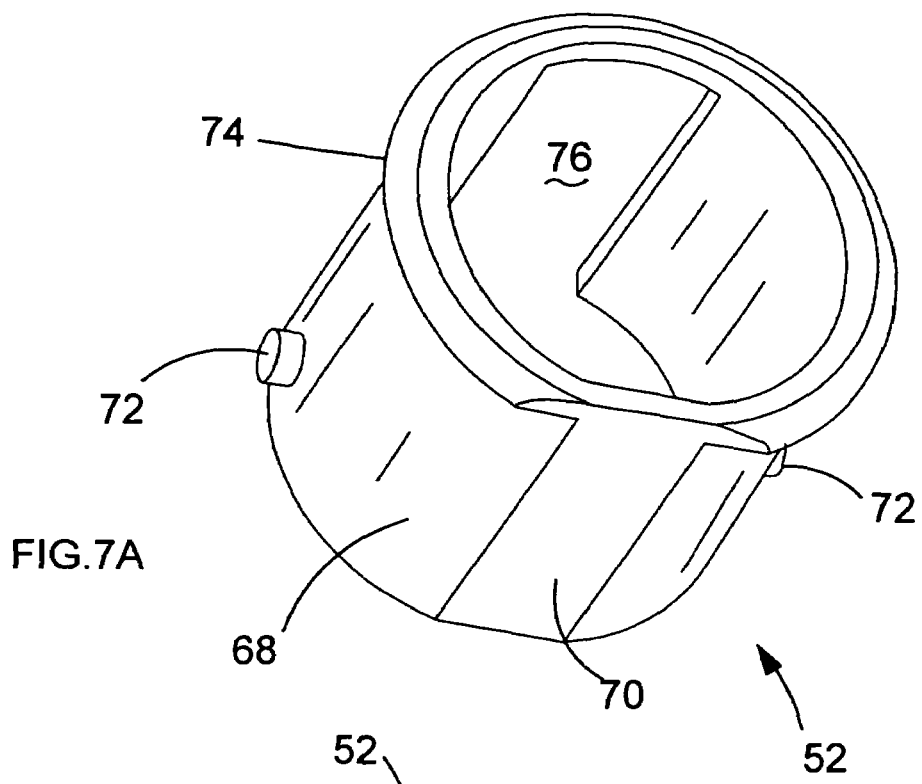
FIGS. 7A and 7B show perspective views of the first inner sleeve when view from its two ends.
Figure 7B:
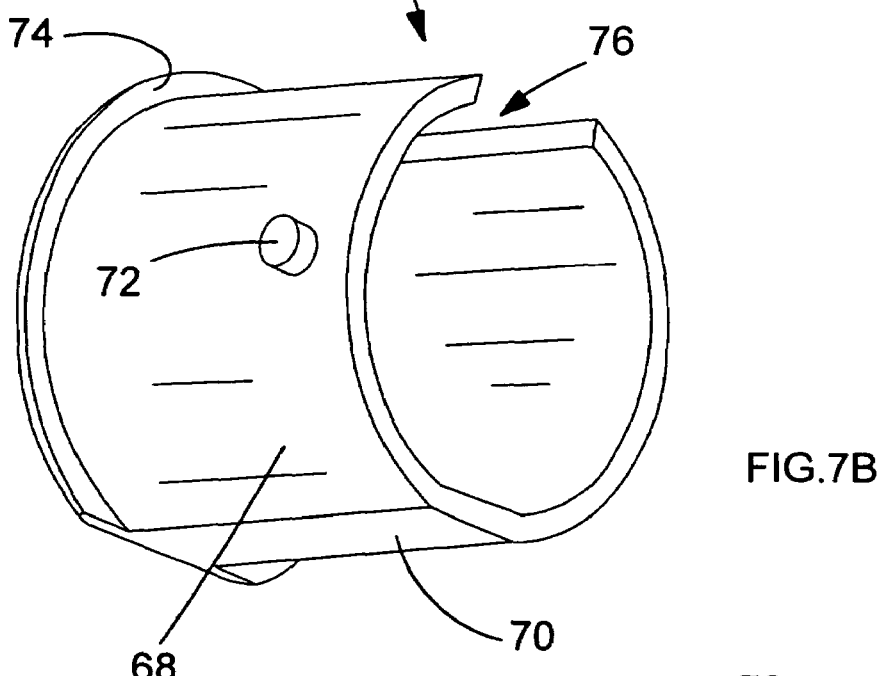

The guard comprises two sleeves, a first inner sleeve 52 and a second outer sleeve 54. The second outer sleeve 54 is shown in FIGS. 6A and 6B. The first inner sleeve 52 is shown in FIGS. 7A and 7B. When the guard is assembled, the first inner sleeve 52 slideably mounted within and is capable of sliding into and out of the second outer sleeve 54 in a telescopic fashion.

Referring to FIGS. 6A and 6B, the second outer sleeve 54 comprises a tubular body 56 of approximately circular cross-section. Formed along the length of the tubular body 56 on one side is a flat section 58. Formed in the wall of the tubular body 56, are two elongate slots 60 which run lengthwise along the body 56 and which are located on opposite sides of the body 56 to each other in a symmetrical fashion about the flat section 58.

Formed, in symmetrical fashion, on one end of the second outer sleeve 54, are two flanges 62 which project in opposite directions radially outwards from the longitudinal axis of the second sleeve 54. A bore 64 is formed through each of the flanges 62. The axis of each bore 64 is parallel to the longitudinal axis of the second outer sleeve 54.

A section 66 of the wall of the tubular body 56 on the opposite side to the flat section 58 has been removed.

Figure 1:
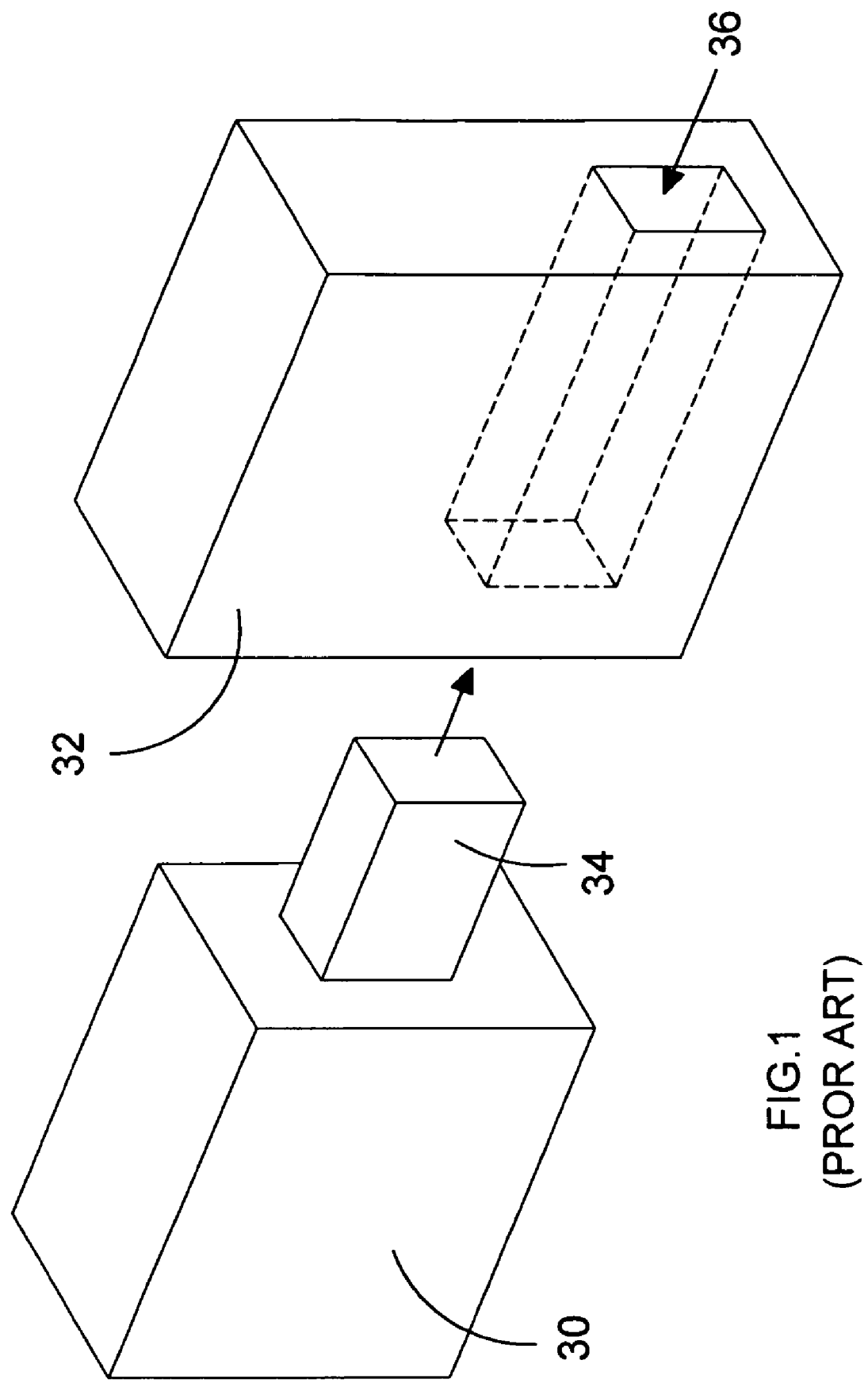
FIG. 1 shows a sketch of an exploded view of a mortise and tenon joint.
Figure 2:
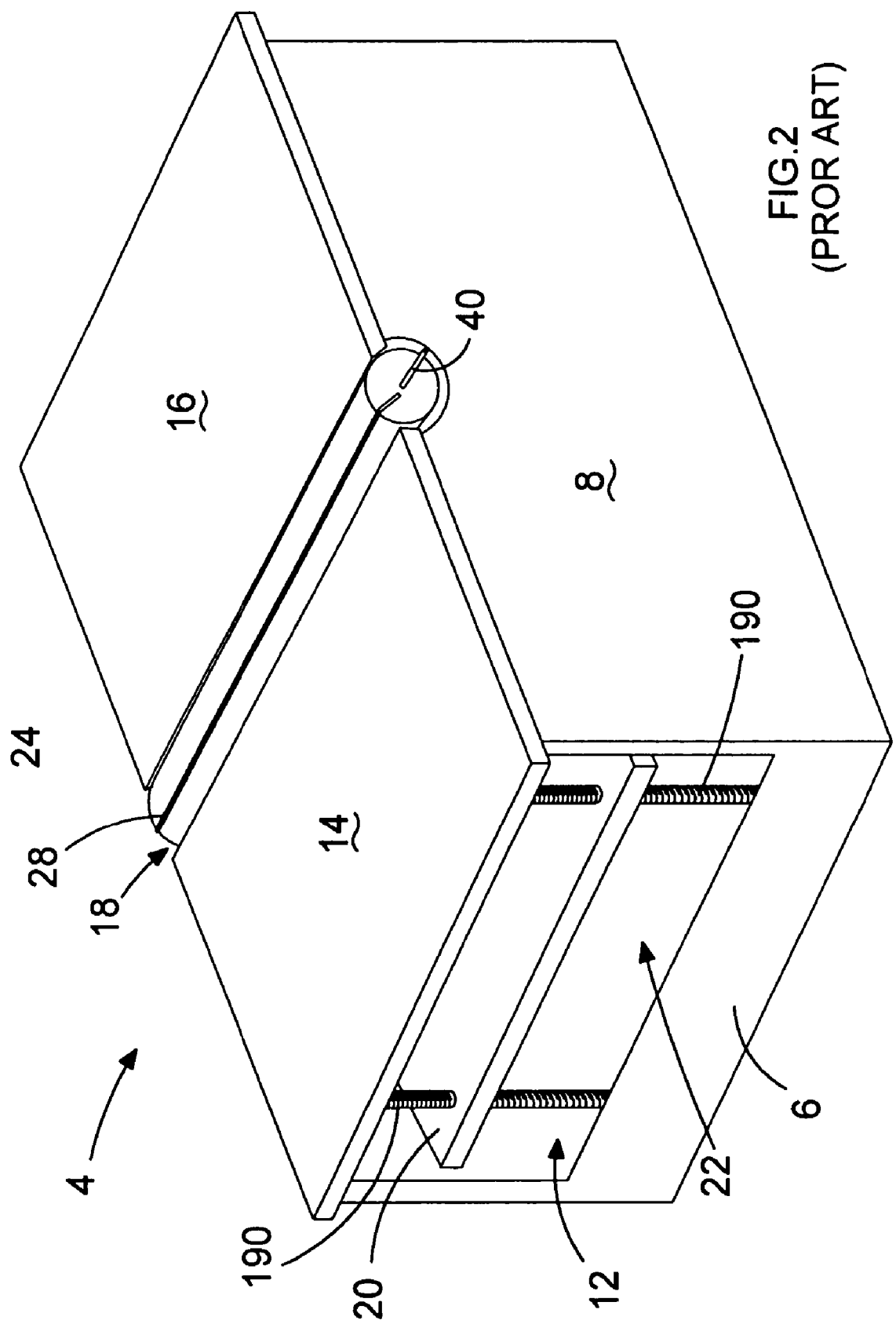
FIG. 2 shows a sketch of a planer and thicknesser.
Figure 3:
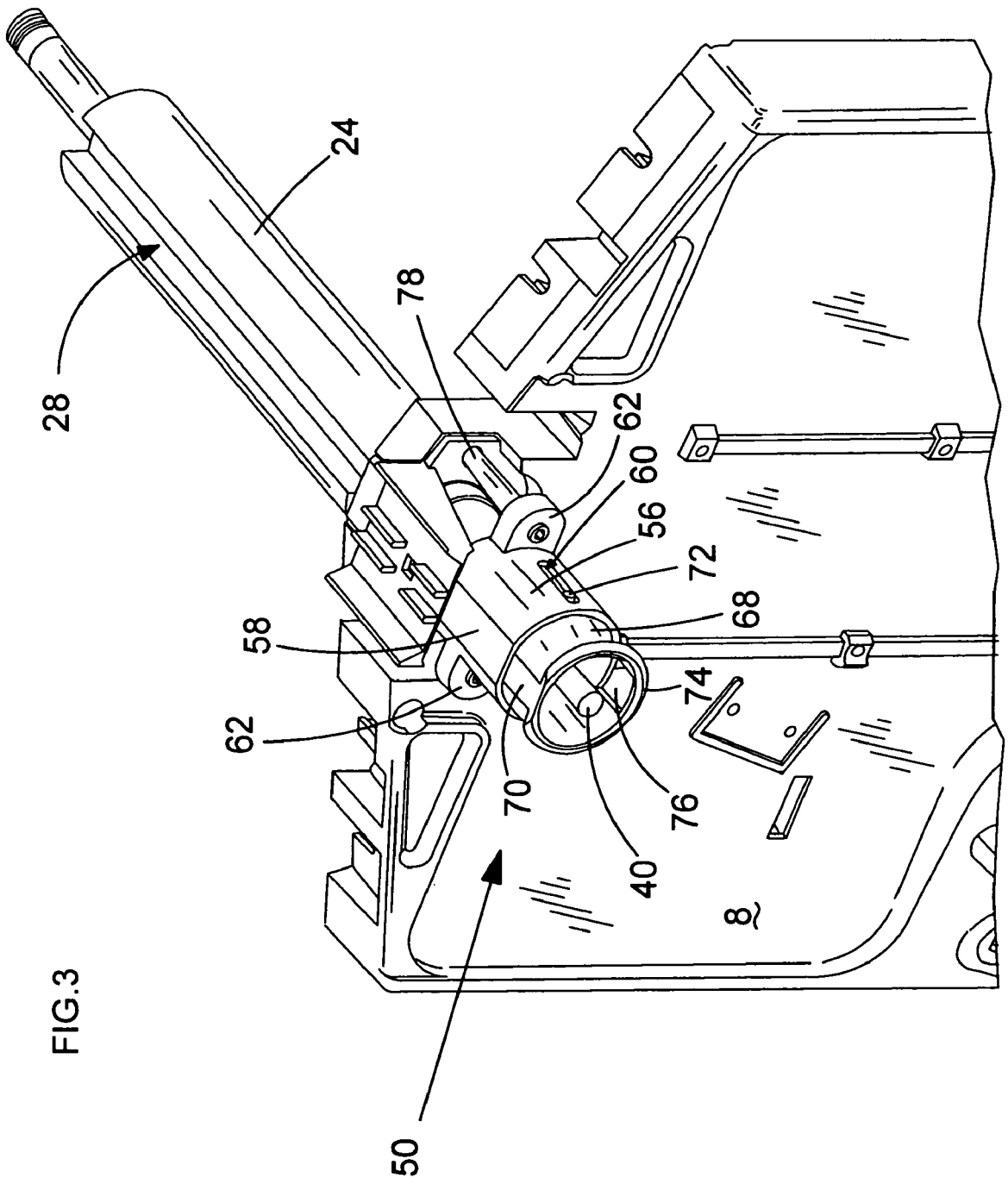
FIG. 3 shows a perspective view of a side wall of a planer and thicknesser together with the cutting drum, cutting tool and guard (excluding springs) according to the present invention.
Figure 4:
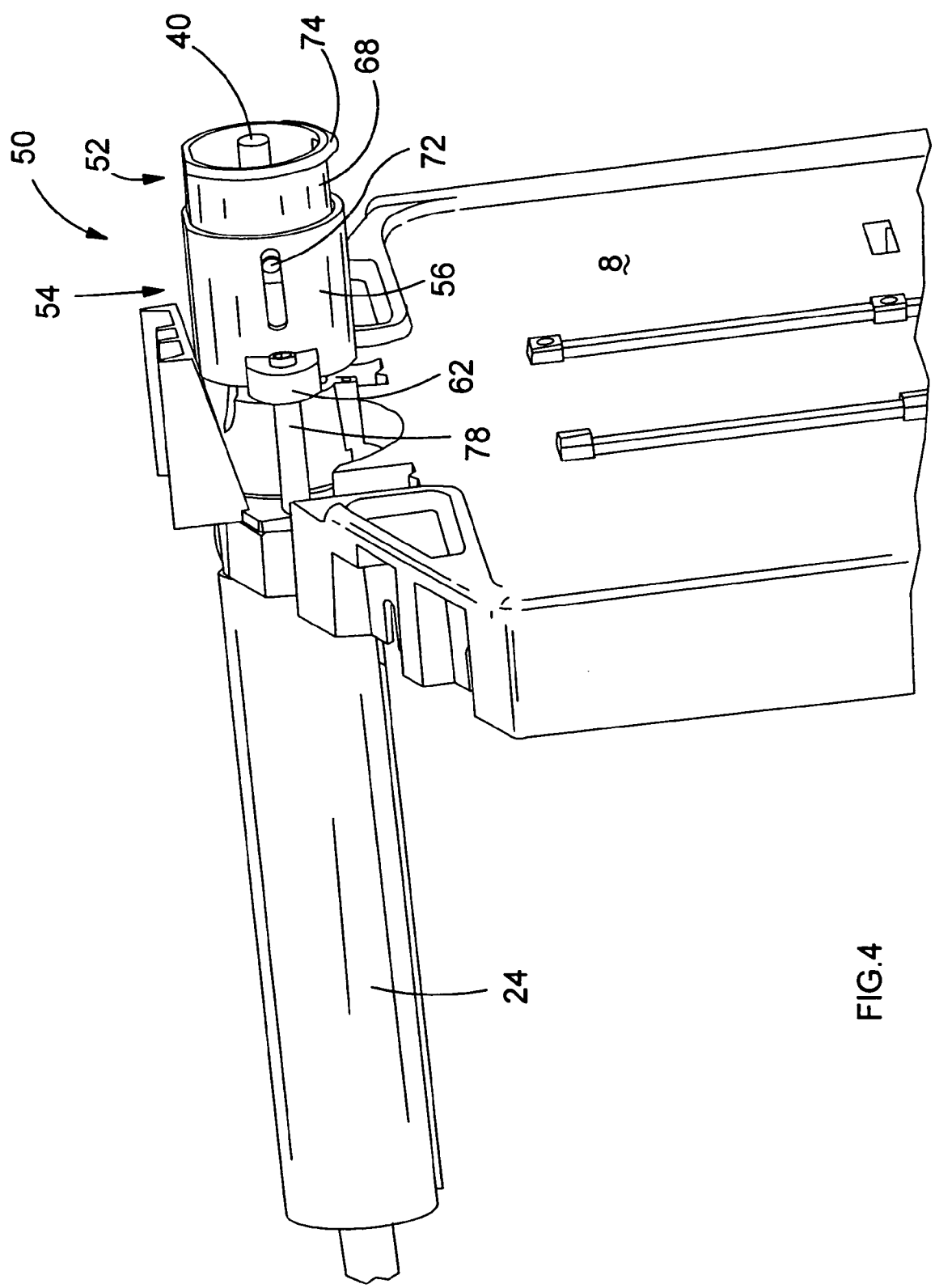
FIG. 4 shows a side view of a side wall of a planer and thicknesser together with the cutting drum, cutting tool and guard (excluding springs) according to the present invention.

Referring to FIGS. 7A and 7B, the first inner sleeve 52 comprises a tubular body 68 also of approximately circular cross-section. Formed along the length of the tubular body 68 on one side is a flat section 70. The diameter of the tubular body 68 of the first inner sleeve 52 is slightly less than that of the diameter of the tubular body 56 of the second outer sleeve 54. This is to allow the first inner sleeve 52 to slideably locate within the second outer sleeve as shown in FIGS. 3 and 4. The flat section 70 of the first inner sleeve 52 locates adjacent the flat section 58 of the second outer sleeve 54 thus preventing (when the pegs 72 (described below) are not attached) or assists in preventing relative rotation of the first inner sleeve 52 relative to the second outer sleeve 54. When the first inner sleeve 52 is slideably located within the second outer sleeve 54, their longitudinal axes are co-axial.

Two pegs 72 project in symmetrical fashion radially outwards, in opposite directions, from the longitudinal axis of the tubular body 68 of the first inner sleeve 52. When the first inner sleeve 52 is located within the second outer sleeve 54, each of the pegs 72 locates within a corresponding elongate slot 60 as shown in FIGS. 3 and 4. The pegs 72 are attached to the tubular body 68 of the first inner sleeve 52 during assembly of the guard. When the first inner sleeve 52 is slideably located within the second outer sleeve 54, the pegs 72 are passed through the elongate slots 60 and attached to the first inner sleeve 52. As the first inner sleeve 52 slides into and out of the second outer sleeve 54, each peg 72 slides along its corresponding elongate slot 60. The elongate slots 60 limit the amount of sliding movement of the first inner sleeve 52 within the second outer sleeve 54 as well as preventing it from being withdrawn totally from the second outer sleeve 54.

A section 76 of the wall of the tubular body 68 of the first inner sleeve 52 on the opposite side to the flat section 70 has been removed.

Figure 5:
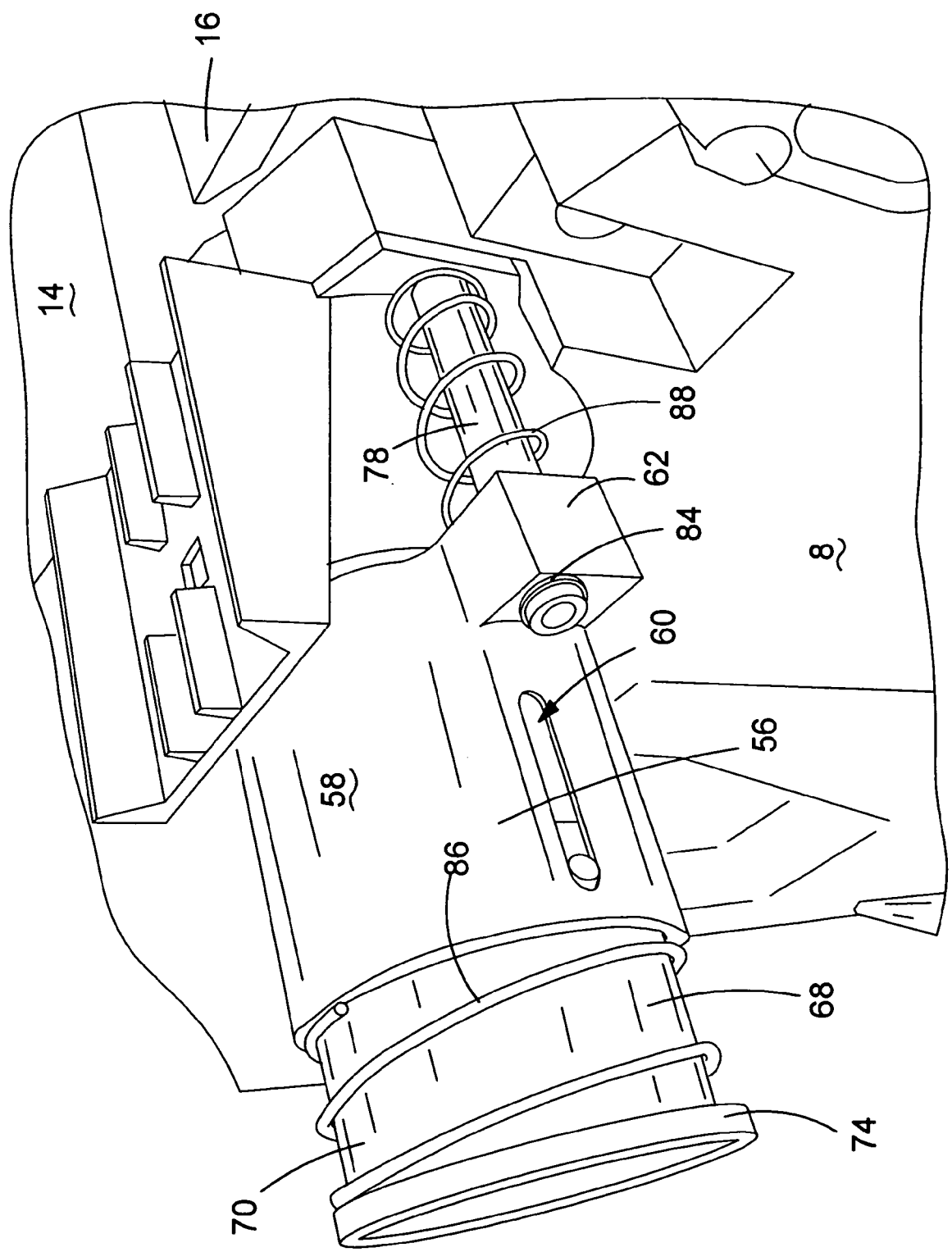
FIG. 5 shows a side view of the guard.

A rim 74 has been formed around one end of the first inner sleeve 52 having a diameter the same as the diameter of the tubular body 56 of the second outer sleeve 54. A first helical spring 86 is sandwiched between the rim 74 of the first inner sleeve 52 and the end of the second outer sleeve 54 as best seen in FIG. 5. The first spring biases the first inner sleeve 52 outwardly, urging it to slide out of the second outer sleeve 54 and thus, when no additional force is applied to the first inner sleeve 52, causes the first inner sleeve 52 to extend by its maximum amount out from the second outer sleeve 54. It should be noted that FIGS. 3 and 4 do not show the spring 86. However, FIGS. 5, 9, 10 and 11 do show the spring 86.

Figure 8:
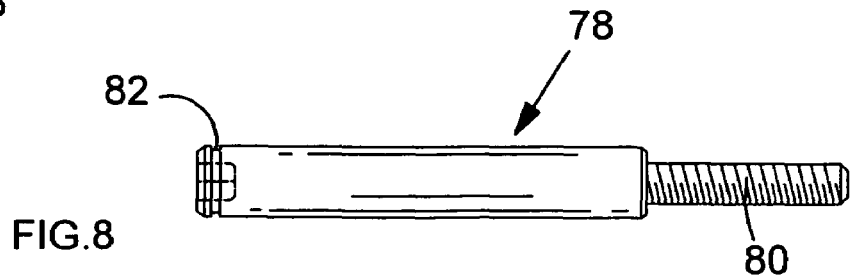
FIG. 8 shows a side view of one of the two support rods.
Figure 9:
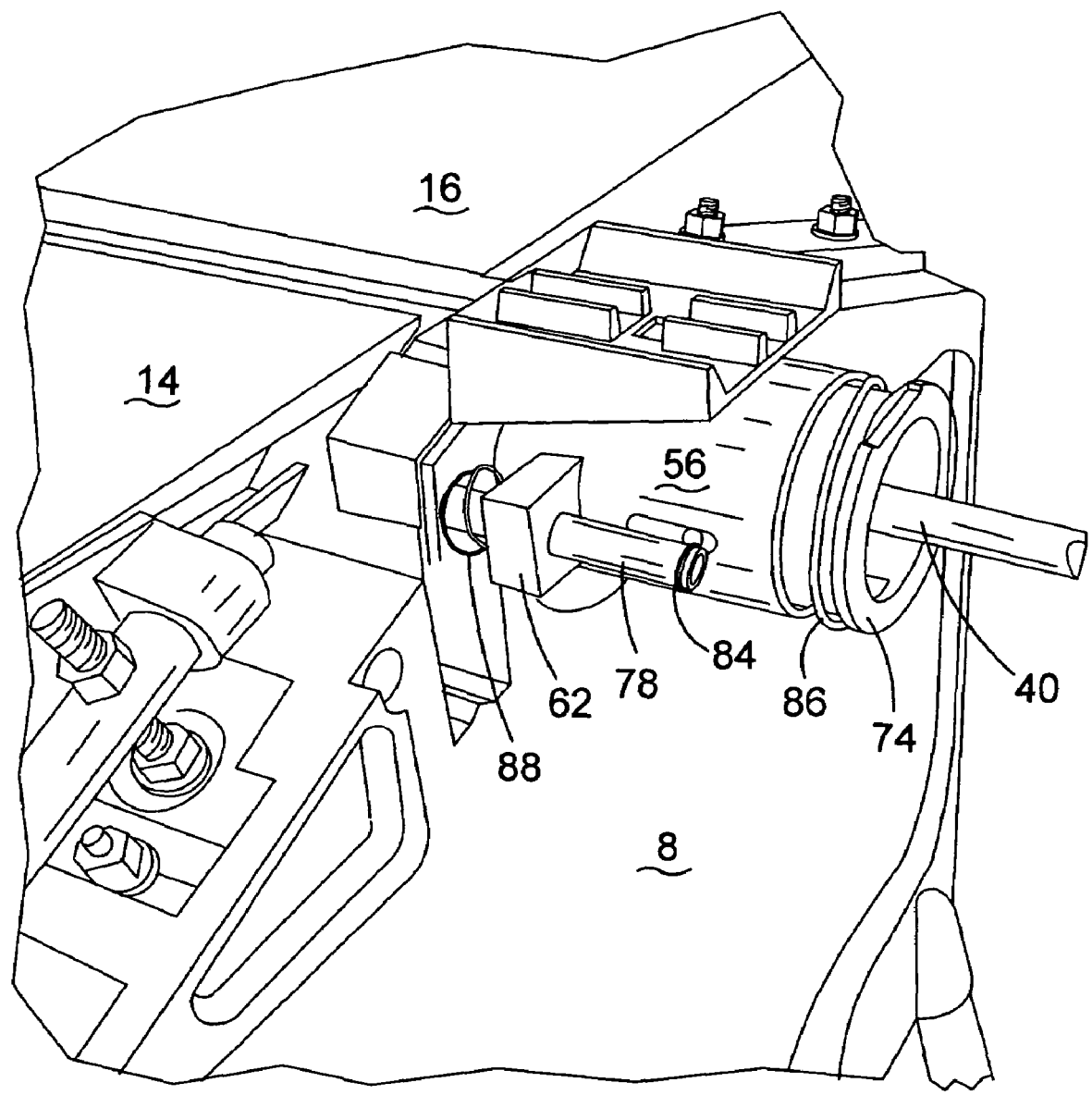
FIG. 9 shows a view of the guard partially surrounding the cutting tool.
Figure 10:
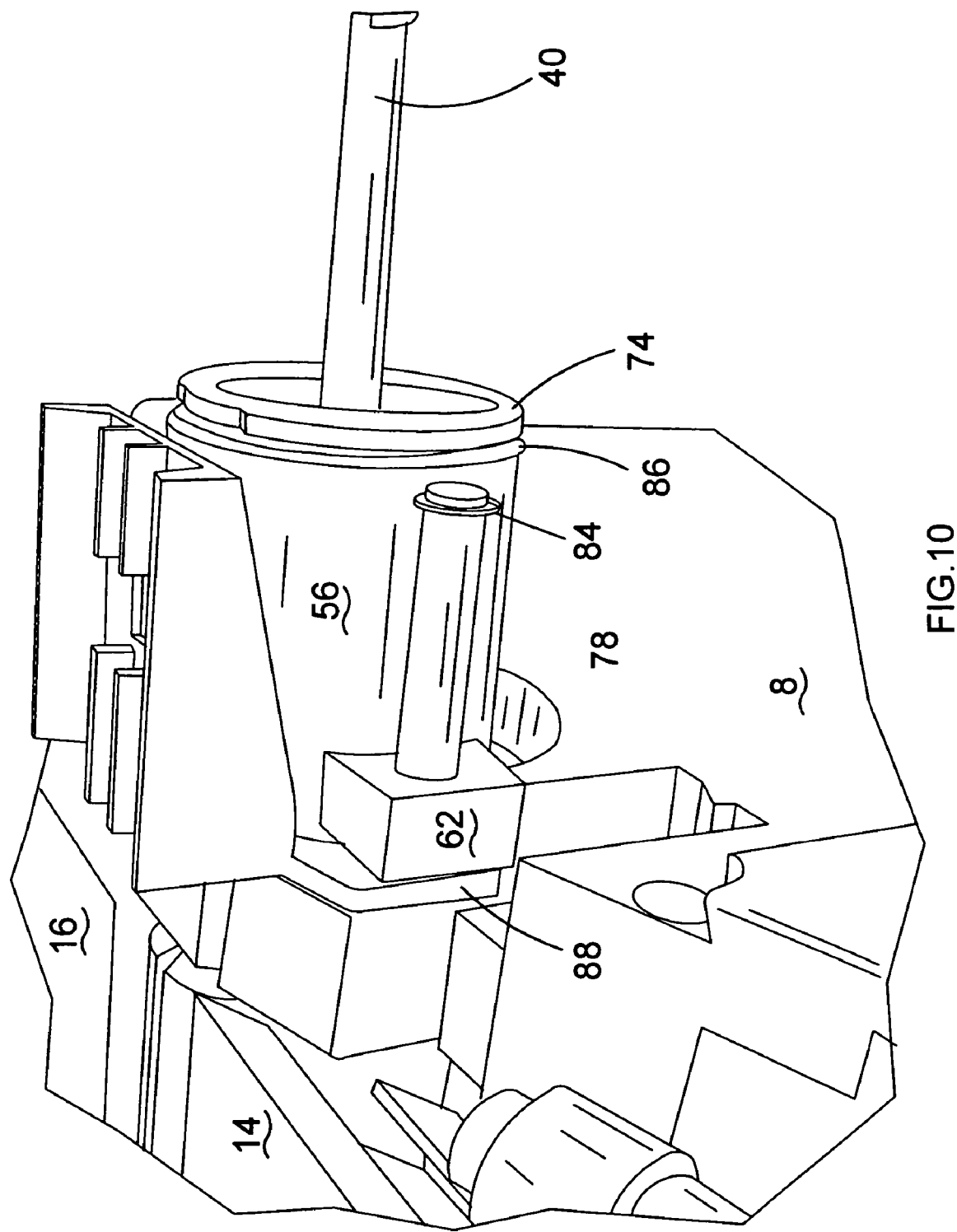
FIG. 10 shows a side view of the guard fully retracted.
Figure 11:
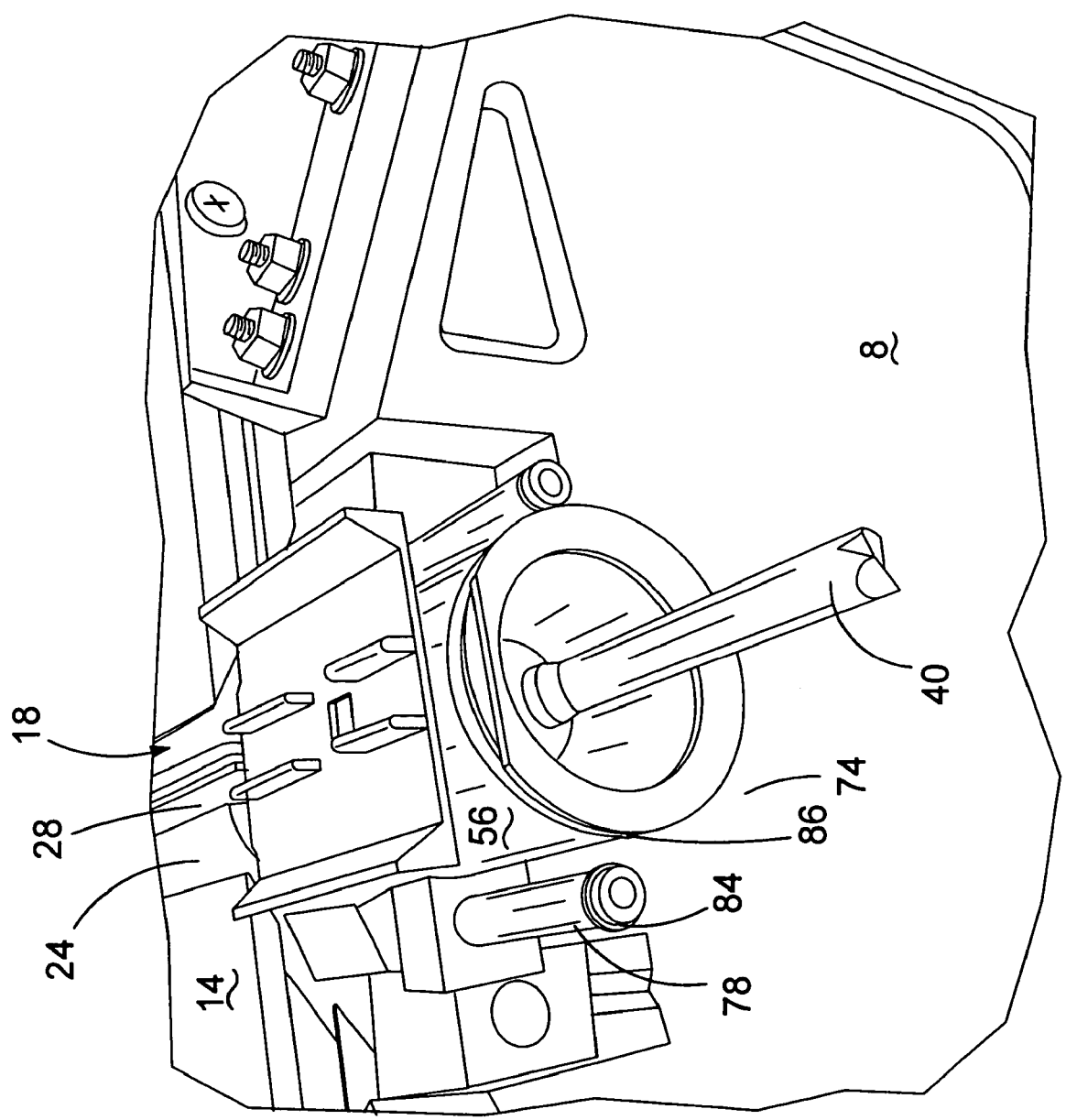
FIG. 11 shows a top view of the guard fully retracted.

The second outer sleeve 54 is slideably mounted on two support rods 78. FIG. 8 shows one of the support rods 78. One end 80 of each of the support rods 78 is rigidly attached to the wall 8 of the frame 4 of the planer and thicknesser. The two support rods project horizontally from the wall 8, in parallel. The longitudinal axes of the two rods 78 are co-axial with and located within the same plane as the longitudinal axis of the cutting drum 24, the two rods 78 being located on opposite sides of the longitudinal axis of the cutting drum 24 in symmetrical fashion.

Each of the support rods 78 passes through a corresponding bore 64 formed in the flanges 62 of the second outer sleeve as shown in the figures. The second outer sleeve 54 can freely slide along the two rods 78. A circlip 84 is attached to a groove 82 formed in the other end of the rods 78 to prevent the second outer sleeve sliding off the rods 78. Thus the flanges 62 of the second outer sleeve 54 can slide between the wall 8 of the planer and thicknesser and the circlip 84.

Each of the two support rods 78 has a second spring 88 surrounding it which is sandwiched between the wall 8 of the planer and thicknesser and a side of the flange 62 through which it passes. Each second spring 88 biases the flange 62 of the second outer sleeve 54 outwardly along the support rods 78 away from the planer and thicknesser, urging it to slide away from the wall 8 and thus, when no additional force is applied to the second outer sleeve 54, causes it to slide by the maximum amount away from the wall 8. It should be noted that FIGS. 3 and 4 do show the second springs 88. However, FIGS. 5, 9, 10 and 11 do show the second springs 88.

In use, the two sleeves are biased by the first 86 and second 88 springs outwardly away from the wall 8 of the planer and thicknesser so that the first inner sleeve 52 extends by its maximum amount out from the second outer sleeve 54 and the second outer sleeve 54 to slide by the maximum amount along the support rods 78 away from the wall 8. When a cutting tool 40 is attached to the cutting drum 24, the extended sleeves 52, 54, will surround the cutting tool 40 thus preventing contact with it. The rim of the first inner sleeve will extend beyond the end of the cutting tool 40 so that the cutting tool is located entirely within the two sleeves 52, 54. When an operator wishes to use the rotating cutting tool 40, the operator pushes the sleeves 52, 54 against the biasing force of the springs 86, 88 towards the wall 8 of the planer and thicknesser so that the first inner sleeve 52 slides into the second outer sleeve 54 and the second outer sleeve slides along the support rods 78 towards the wall 8 of the planer and thicknesser, thus exposing the cutting tool. The sleeves 52, 54 are then held against the biasing forces of the springs whilst the cutting tool is used. The sleeves 52, 54 can be moved and held against the biasing forces of the springs 86, 88 using the work piece to be cut.

It will be appreciated that, though the embodiment makes reference to a cutting tool for drilling mortises for mortise and tenon joints, other types of cutting tool can be attached and which can be protected by the guard. For, example, a standard drill bit could be attached.

The invention claimed is:

1. A planer comprising:
   a frame;
   at least one table mounted to the frame;
   a cutting drum rotatably mounted within the frame;
   a motor mounted within the frame to rotatingly drive the cutting drum;
   a cutting blade mounted on the periphery of the drum and adapted for cutting a work piece when the drum is rotating;
   a cutting tool having a proximal end and a distal end;
   a rotable socket being connected to the cutting drum so that the rotatable socket is capable of rotating when the cutting drum rotates;
   the rotatable socket receives the proximal end of the cutting tool; and
   a cover member, the cover member mounted to the frame, wherein the cover member covers at least a portion of the distal end of the cutting tool when the cutting tool is located in the rotatable socket.

2. The planer of claim 1, wherein at least a portion of the cover member can be moved from a first position where at least a portion of the cutting tool is surrounded by the cover member to a second position where at least a portion of the cutting tool is exposed.

3. The planer of claim 2, wherein at least the cover slides in a direction parallel to the longitudinal axis of a cutting tool, when a cutting tool is located in the socket, between the cover member's first and second positions.

4. The planer of claim 2, wherein the cover member comprises at least one tubular sleeve which, when located in the first position surrounds at least a portion of the cutting tool when the cutting tool is located within the socket.

5. The planer of claim 4, wherein a longitudinal axis of the tubular sleeve is parallel with or co-axial with a longitudinal axis of the cutting tool, when the cutting tool is located in the socket.

6. The planer of claim 2, wherein the cover member comprises at least two tubular sleeves arranged in a telescopic formation, wherein one sleeve is capable of telescopically sliding into and out of the other sleeve.

7. The planer of claim 6, wherein the longitudinal axes of the tubular sleeves are co-axial.

8. The planer of claim 6, wherein one of the sleeves is biased to telescope out of the other sleeve.

9. The planer of claim 6, wherein the telescopic tubular sleeves are arranged so that, when the cover member is in the second position, the tubular sleeves are telescopically compacted and when the cover member is in the first position, the tubular sleeves are telescopically extended.

10. A guard for a planer comprising:
   a frame;
   at least one table mounted on or within the frame;
   a cutting drum rotatably mounted within the frame;
   a motor mounted within the frame to rotating drive the cutting drum;

a cutting blade mounted on the periphery of the drum and adapted for cutting a work piece when the drum is rotating;

a rotable socket, the rotatable socket connected to the cutting drum and capable of rotating when the cutting drum rotates; and a guard connected to the frame, wherein the guard comprises at least two tubular sleeves, wherein one sleeve is capable of telescopically sliding within the other sleeve, and wherein the rotatable socket is capable of receiving a cutting tool, and wherein the tubular sleeves are arranged so that the tubular sleeves move between two positions, a second position where the tubular sleeves are compacted to expose the cutting tool and a first position, the tubular sleeves are extended to surround a cutting tool.

11. The planer of claim 10, wherein the tubular sleeves each have a longitudinal axis and wherein the longitudinal axes of the tubular sleeves are co-axial.

12. The planer of claim 10 wherein one of the sleeves is biased to telescope out of the other sleeve.

13. The planer of claim 2, wherein the cover member is biased towards the first position.

14. The planer of claim 2, wherein at least a portion of the cover member linearly slides between the cover member's first and second positions.

* * * * *